(12) United States Patent
Voytovych et al.

(10) Patent No.: US 10,619,483 B2
(45) Date of Patent: Apr. 14, 2020

(54) PARTIALLY SHROUDED GAS TURBINE ENGINE FAN

(71) Applicant: United Technologies Corporation, Farmington, CT (US)

(72) Inventors: Dmytro Mykolayovych Voytovych, Rocky Hill, CT (US); Alexander Staroselsky, Avon, CT (US); Om P. Sharma, South Windsor, CT (US); Gabriel L. Suciu, Glastonbury, CT (US); Brian Merry, Andover, CT (US); Ioannis Alvanos, West Springfield, MA (US)

(73) Assignee: United Technologies Corporation, Farmington, CT (US)

( * ) Notice: Subject to any disclaimer, the term of this patent is extended or adjusted under 35 U.S.C. 154(b) by 84 days.

(21) Appl. No.: 15/819,047

(22) Filed: Nov. 21, 2017

(65) Prior Publication Data

US 2019/0153866 A1    May 23, 2019

(51) Int. Cl.

| F01D 5/02 | (2006.01) |
|---|---|
| F01D 5/22 | (2006.01) |
| F01D 5/34 | (2006.01) |
| B64D 33/02 | (2006.01) |
| B64C 11/00 | (2006.01) |

(Continued)

(52) U.S. Cl.
CPC ............ *F01D 5/022* (2013.01); *B64C 11/001* (2013.01); *B64D 33/02* (2013.01); *F01D 5/225* (2013.01); *F01D 5/3061* (2013.01); *F01D 5/34* (2013.01); *F04D 29/321* (2013.01); *F04D 29/326* (2013.01); *B64D 2033/0226* (2013.01); *F05D 2220/323* (2013.01); *F05D 2220/36* (2013.01); *F05D 2230/54* (2013.01); *F05D 2230/80* (2013.01); *F05D 2240/20* (2013.01); *F05D 2250/37* (2013.01); *F05D 2260/15* (2013.01)

(58) Field of Classification Search
CPC ............. F01D 5/022; F01D 5/225; F01D 5/34
See application file for complete search history.

(56) References Cited

U.S. PATENT DOCUMENTS

| 5,562,419 A | 10/1996 | Crall et al. |
|---|---|---|
| 6,454,535 B1 | 9/2002 | Goshorn et al. |
| 6,508,628 B2 | 1/2003 | Amr |

(Continued)

FOREIGN PATENT DOCUMENTS

| CN | 104632701 | 5/2015 |
|---|---|---|
| DE | 10108005 | 8/2002 |

(Continued)

OTHER PUBLICATIONS

The Extended European Search Report for EP Application No. 18207631.5, dated Apr. 26, 2019.

*Primary Examiner* — Woody A Lee, Jr.
*Assistant Examiner* — Michael L Sehn
(74) *Attorney, Agent, or Firm* — Carlson, Gaskey & Olds, P.C.

(57) ABSTRACT

An exemplary gas turbine engine includes a turbine section and a fan mechanically connected to the turbine section such that rotation of the turbine drives rotation of the fan. The fan includes a hub, a plurality of blade bodies extending radially outward from the hub to a first partial shroud, and a plurality of blade tips extending radially outward from the partial shroud.

17 Claims, 3 Drawing Sheets

(51) Int. Cl.
*F01D 5/30* (2006.01)
*F04D 29/32* (2006.01)

(56) References Cited

U.S. PATENT DOCUMENTS

| | | | |
|---|---|---|---|
| 7,758,303 B1* | 7/2010 | Wadia | F01D 5/022 |
| | | | 415/77 |
| 8,192,141 B1* | 6/2012 | Dale | F02C 3/073 |
| | | | 415/199.5 |
| 2009/0028717 A1 | 1/2009 | Belmonte et al. | |
| 2014/0169935 A1* | 6/2014 | Schwarz | F01D 5/225 |
| | | | 415/1 |
| 2017/0081013 A1* | 3/2017 | Marrinan | B64C 1/16 |

FOREIGN PATENT DOCUMENTS

| | | |
|---|---|---|
| EP | 0470763 | 2/1992 |
| EP | 1895142 | 3/2008 |
| EP | 2920068 | 9/2015 |
| WO | 2014143292 | 9/2014 |

\* cited by examiner

PARTIALLY SHROUDED GAS TURBINE ENGINE FAN

TECHNICAL FIELD

The present disclosure relates generally to fan configurations for a gas turbine engine, and more specifically to a partially shrouded fan configuration for the same.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. A fan is also connected to the shaft and is driven to rotate via rotation of the turbine as well.

In some alternative engines, alternative sources of compressed air can be utilized, with the alternative sources being referred to as gas generators. The alternative engines can include the gas generators in line with the combustor and the turbine section, or out of line with the turbine section, depending on the needs of the aircraft incorporating the particular engine.

Rotation of the fan causes the tips of the fan blades to travel at a substantially faster speed than the primary body portions of the fan blades, resulting in greater levels of air ingestion at the blade tip portion than at the body portion of the fan blade. This, in turn, can result in unsteady loading due to inlet distortion of the fan blades.

SUMMARY OF THE INVENTION

In one exemplary embodiment a gas turbine engine includes a turbine section, a fan mechanically connected to the turbine section such that rotation of the turbine drives rotation of the fan, wherein the fan comprises: a hub, a plurality of blade bodies extending radially outward from the hub to a first partial shroud, and a plurality of blade tips extending radially outward from the partial shroud.

In another example of the above described gas turbine engine the first partial shroud is positioned at a radial intersection with a boundary layer ingestion of a fan inlet.

In another example of any of the above described gas turbine engines the first partial shroud is positioned in the range of 70% span to 90% span, where the hub defines 0% span and a radially outermost tip of the blade tips defines 100% span.

Another example of any of the above described gas turbine engines further includes an outer shroud radially outward of the plurality of blade tips, and wherein the blade tips span from the partial shroud to the outer shroud.

In another example of any of the above described gas turbine engines a quantity of blade tips in the plurality of blade tips is a multiple of a quantity of blade bodies in the plurality of blade bodies.

In another example of any of the above described gas turbine engines a subset of the plurality of blade tips is aligned with corresponding blade bodies.

In another example of any of the above described gas turbine engines a quantity of blade tips in the plurality of blade tips is independent of a quantity of blade bodies in the plurality of blade bodies.

In another example of any of the above described gas turbine engines the gas turbine engine is a boundary layer ingestion engine.

Another example of any of the above described gas turbine engines further includes a second partial shroud radially inward of the first partial shroud.

In another example of any of the above described gas turbine engines the first partial shroud and the plurality of blade tips are a single integral component.

In another example of any of the above described gas turbine engines the first partial shroud is attached to each blade tip in the plurality of blade tips.

In another example of any of the above described gas turbine engines the first partial shroud extends at least a full axial length of the plurality of blade tips, relative to an axis defined by the fan.

In another example of any of the above described gas turbine engines the first partial shroud extends less than a full axial length of the plurality of blade tips, relative to an axis defined by the fan.

In another example of any of the above described gas turbine engines an axial length of each blade tip in the plurality of blade tips is less than an axial length of each blade body in the plurality of blade bodies.

In another example of any of the above described gas turbine engines a ratio of the axial length of each of the blade bodies in the plurality of blade bodies to an axial length of each of the blade tips in the plurality of blade tips is less than or equal to two.

In one exemplary embodiment a fan for a gas turbine engine includes a hub, a first partial shroud radially outward of the hub, a plurality of blade bodies extending from the hub to the partial shroud, and a plurality of blade tips extending radially outward from the partial shroud.

In another example of the above described fan for a gas turbine engine the partial shroud is positioned in the range of 70% span to 90% span, where the hub defines 0% span and a radially outermost tip of the plurality of blade tips defines 100% span.

In another example of any of the above described fans for a gas turbine engine a quantity of blade tips in the plurality of blade tips is a multiple of a quantity of blade bodies in the plurality of blade bodies.

In another example of any of the above described fans for a gas turbine a subset of the plurality of blade tips is aligned with corresponding blade bodies.

Another example of any of the above described fans for a gas turbine further includes a second partial shroud disposed between the hub and the first partial shroud.

These and other features of the present invention can be best understood from the following specification and drawings, the following of which is a brief description.

DETAILED DESCRIPTION OF AN EMBODIMENT

Figure 1:
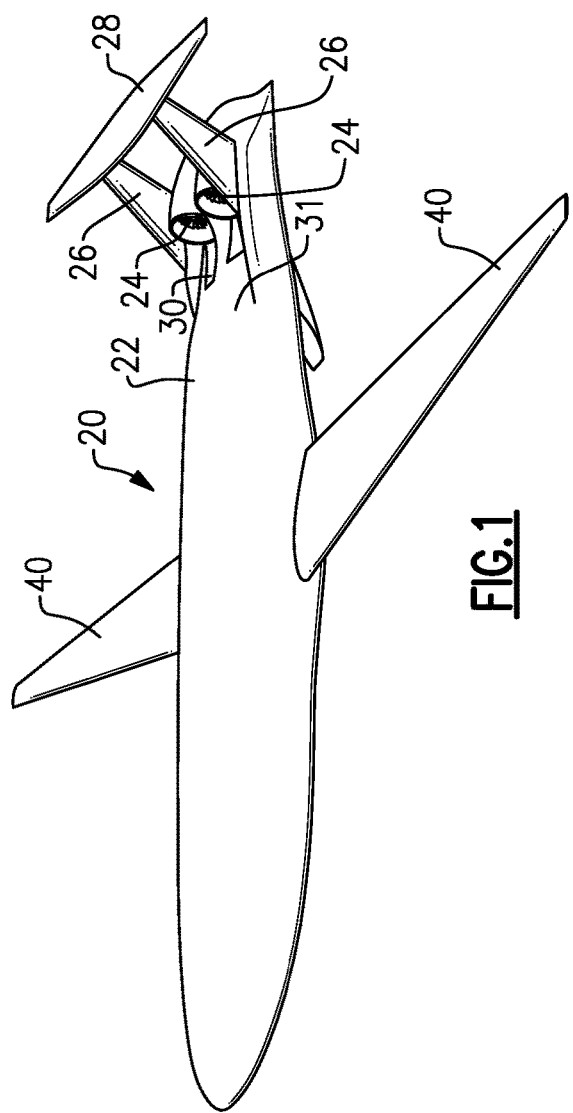
FIG. 1 illustrates a high level schematic view of an exemplary aircraft including an aft mounted turbine engine.

FIG. 1 shows an exemplary generic aircraft body 20. Engines 24 are mounted between stabilizers 26, which connect to a tail 28. An inlet 30 to the gas turbine engines 24 curves away from an upper surface of the fuselage 22. The curvature of the inlet 30 allows the boundary layer air on the top surface 31 of the fuselage to be ingested into the gas turbine engine 24 thereby reducing drag on the fuselage. In alternative examples, the aircraft body 20 can include engines 24 disposed under the wings 40, or in the wings 40, or in any other conventional aircraft location. In such examples the gas turbine engine 24 can drive the fan via a direct drive or a geared connection, depending on the needs of the particular aircraft.

Figure 2:
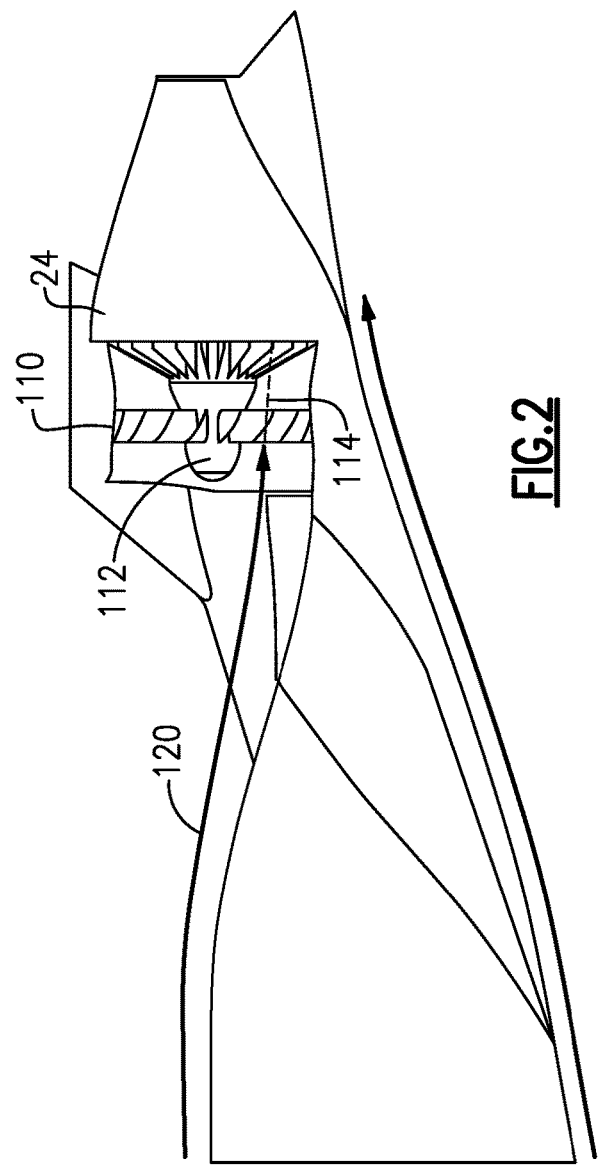
FIG. 2 schematically illustrates a zoomed schematic view of the tail section of the aircraft of FIG. 1.

With continued reference to FIG. 1, FIG. 2 schematically illustrates a side view of the tail section of the aircraft 20 in greater detail. The engine 24 includes a fan 110 mounted to a fan hub 112. As the exemplary engine 24 is a boundary layer ingestion engine, the fan 110 energizes a boundary layer 120 flow, and ingests the boundary layer 120. The ingestion of the boundary layer air can increase fuel efficiency by decreasing the drag on the aircraft fuselage. However, in addition to the increased fuel efficiency, the illustrated configuration can cause the fan blades to experience high amounts of unsteady loading due to inlet distortion.

Figure 3:
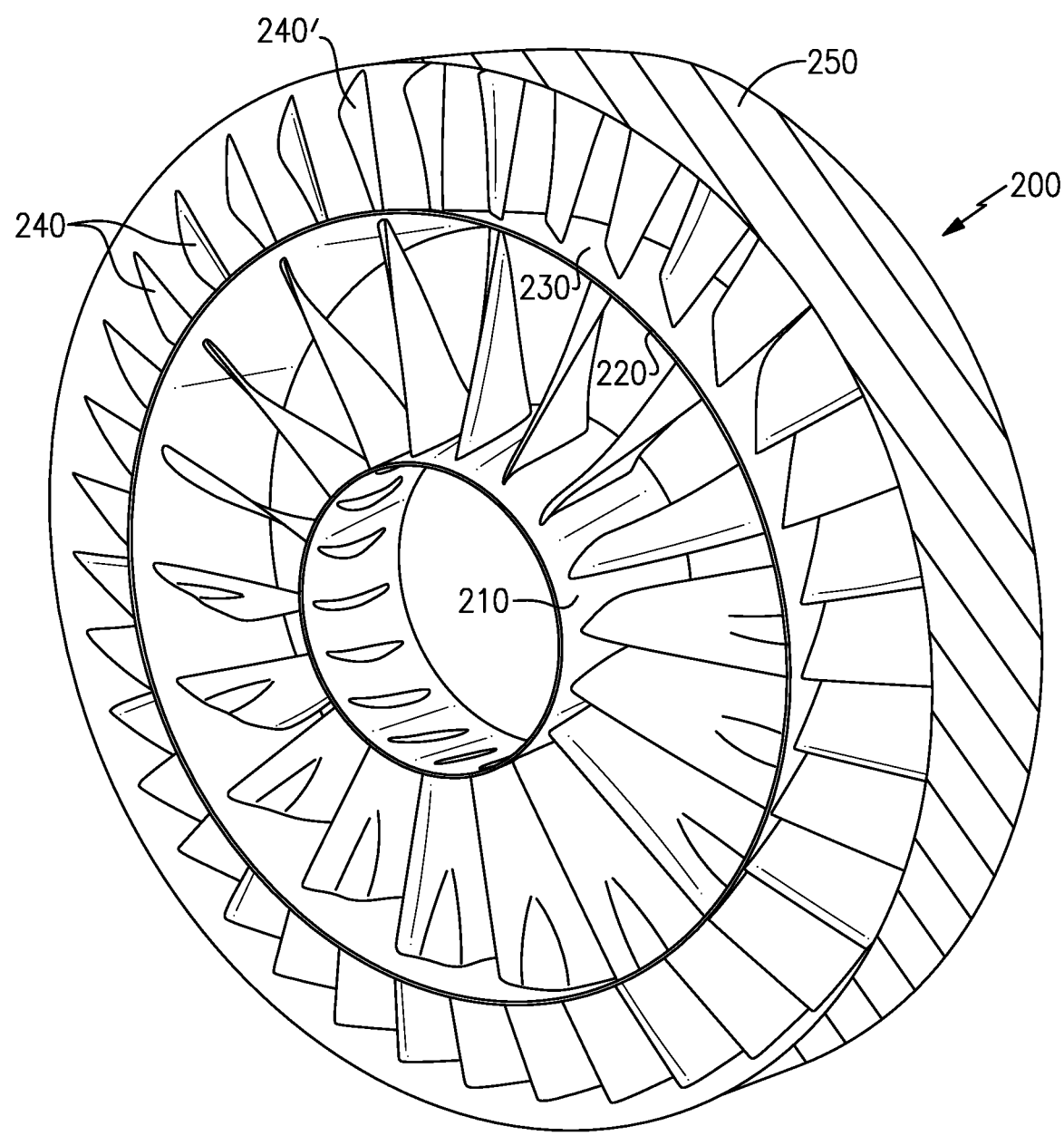
FIG. 3 schematically illustrates an exemplary partial shroud fan configuration.

In order to offset the unsteady loading, the fan 110 can be constructed using a partial shroud which separates the blade tips from the blade bodies. One example construction of a partial shroud fan 200 is illustrated at FIG. 3. The partial shroud fan 200 includes an inner hub ring 210 that is configured to connect the fan 200 to a fan hub, such as the fan hub 112 of FIG. 2. Protruding radially outward from the inner hub ring 210 is a set of blade bodies 220. The blade bodies 220 have an aerodynamic profile and drive fluid to flow through the fan 200 when the fan 200 is rotated by the fan hub 112.

Each of the blade bodies 220 spans from the inner hub ring 210 to a partial shroud 230, radially outward of the inner hub ring 210. Protruding radially outward from the partial shroud 230 are multiple blade tips 240. As with the blade bodies 220, the blade tips 240 include an aerodynamic profile that drives fluid through the fan 200, when the fan 200 is rotated by the fan hub 112. Further, the presence of the partial shroud 230 allows for the blade tips 240 to be stiffer, and accounts for the uneven loading described above. In some examples, such as the illustrated partial shrouded fan 200 of FIG. 3, an outer shroud 250 is included at the radially outermost edge of the blade tips 240. In yet further alternate examples, knife seals can protrude radially outward from the outer shroud in order to facilitate sealing the fan 200 against a radially outward housing.

In the example of FIG. 3, there are twice as many blade tips 240 as there are blade bodies 220. A subset 240' of the blade tips 240 are aligned with a corresponding blade body 220, such that the combined profile would form a conventional blade profile without the interruption of the partial shroud 230. The remainder of the blade tips 240 are disposed adjacent to, and equidistant from, two of the blade tips 240' from the subset, such that an alternating blade tip configuration is created. In alternative examples, the fan 200 can utilize three blade tips 240 to every blade body 220, four blade tips 240 to every blade body 220, or any other ratio, depending on the particular needs of the engine incorporating the fan 200.

Figure 4:
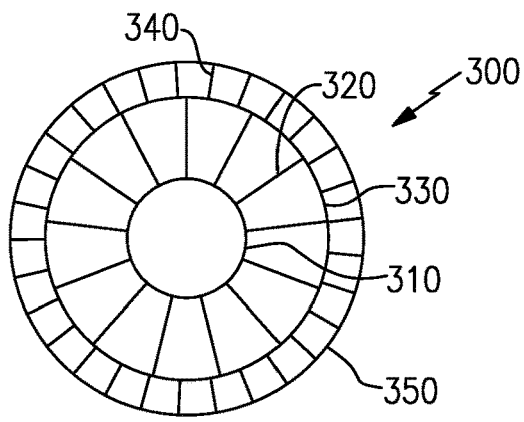
FIG. 4 schematically illustrates an alternate exemplary partial shroud fan configuration.

With continued reference to FIG. 3, FIG. 4 schematically illustrates an alternate example fan 300, including an inner hub ring 310, a partial shroud 330, and a set of fan blade bodies 320 spanning from the inner hub ring 310 to the partial shroud 330. Unlike the fan 200 of FIG. 3, the blade tips 340 are not correlated with the blade bodies 320, and the number of blade tips 340 utilized is not required to be a multiple of the number of blade bodies 320. As with the example of FIG. 3, the blade tips 340 span from the partial shroud 330 to an outer shroud 350.

Figure 5:
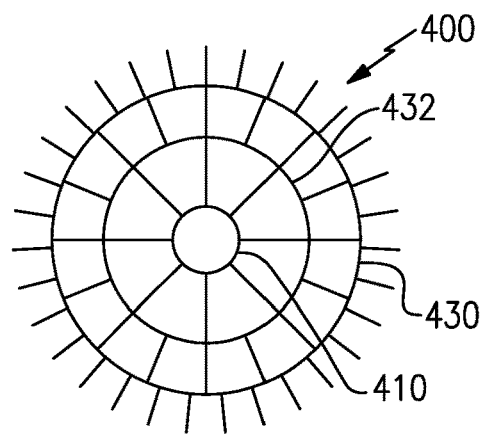
FIG. 5 schematically illustrates another alternate exemplary partial shroud fan configuration.

With continued reference to the examples of FIGS. 3 and 4, FIG. 5 schematically illustrates a further example fan 400. While similar to the example of FIG. 3, the fan 400 of FIG. 5 includes a secondary partial shroud 432 midway between the inner hub ring 410 and the partial shroud 430. The inclusion of the secondary partial shroud 432 allows for a greater granularity in control over the amount of fluid ingested at any given radial position, by the fan 400 due to the variation in the number of blade bodies at a given span. While illustrated in the example of FIG. 5 as utilizing cascading increasing multiples of blade portions and tips, with each ring doubling the number of aerodynamic elements, it should be understood that a configuration similar to that illustrated in FIG. 4 could be utilized as well.

Referring again to the examples of FIGS. 2-4, when the fan is included within a boundary layer ingestion engine 24, the partial shroud 230, 330 is positioned at a radial intersection 114 with the boundary layer 120. As the crossover of the fan blades from outside the boundary layer to inside the boundary layer increases the unsteady loading, positioning the partial shroud at the boundary layer can counteract the additional unsteady loading.

By way of example, the partial shroud is positioned between 70% span and 90% span in some examples, with the inner hub ring 210, 310 defining the 0% span, and the radially outermost tip of the blade tips 240, 340 defining the 100% span. In alternative examples, the partial shroud can be positioned between 75% span and 85% span. In yet further examples, the partial shroud can be positioned at approximately 85% span, plus or minus 2%.

With continued reference to the examples of FIGS. 1-5, multiple different partial shroud designs can be utilized depending on the needs and structure of a given engine. In the example of FIG. 5, distinct partial shroud configurations could be utilized in a single engine at each of the partial shroud locations.

Figure 6:
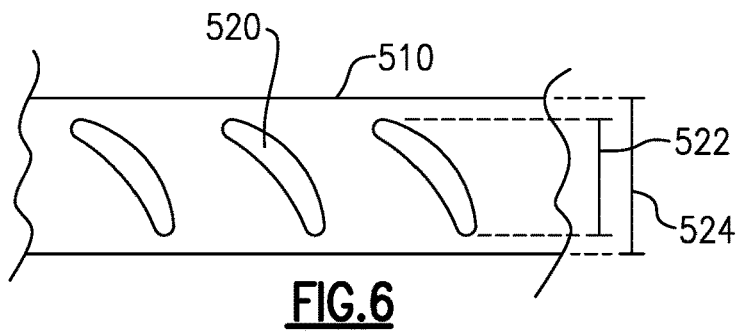
FIG. 6 schematically illustrates a cross section of a first exemplary partial shroud.

Referring to FIG. 6, a radially outward view of a partial shroud 510 and multiple blade tips 520 is illustrated. Each of the blade tips 520 includes an axial length 522, relative to an axis defined by the fan, extending from a leading edge to a trailing edge of the blade tip 520. The partial shroud 510 has a shroud axial length 524 that is at least the full axial length blade tips 520, thereby providing additional support for the blade tips.

Figure 7:
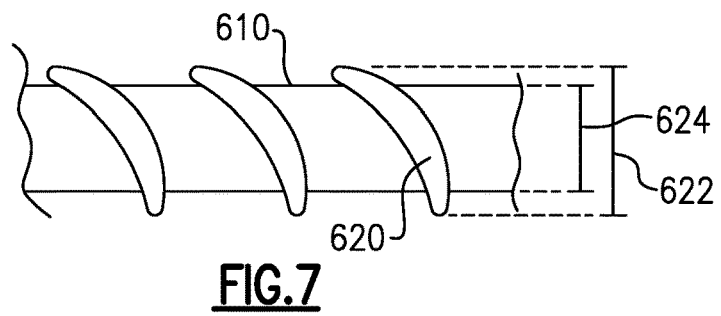
FIG. 7 schematically illustrates a cross section of a second exemplary partial shroud.

Referring to FIG. 7, a radially outward view of an alternate example including blade tips 620 is illustrated. As with the example of FIG. 6, the blade tips 620 extend an axial length 622. Unlike the example of FIG. 6, the partial shroud 610 has a shroud length 624 that is less than the axial length 622 of the blade tips 620.

Figure 8:
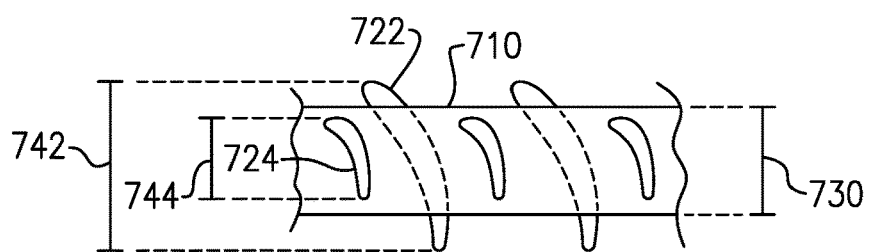
FIG. 8 schematically illustrates a cross section of a third exemplary partial shroud.

With continued reference to FIGS. 1-7, FIG. 8 schematically illustrates another exemplary partial shroud 710 including blade bodies 722 and blade tips 724. In the example of FIG. 8, the blade bodies 722 and the blade tips 724 are unaligned as described above. The partial shroud 710 defines an axial length 730. Each of the blade bodies 722 defines a length 742 from the leading edge to the trailing edge that is greater than the axial length 730 of the partial shroud 710. Each of the blade tips 724 defines a length 744 from a leading edge to a trailing edge that is less than the axial length 730 of the partial shroud 710. In some examples of this configuration, a ratio of the axial length 742 of the blade bodies 722 to the axial length 744 of the blade tips 724 is less than or equal to two.

Referring again to all examples, and using the numerals of FIG. 3 for representative purposes, it should be appreciated that in some examples the partial shroud 230 is a distinct element from the hub ring 210 and blade bodies 220. Further, the blade tips 240 can be constructed integral to the partial shroud 230 or connected to the partial shroud 230 during assembly. In either case, utilization of a distinct partial shroud 230 component allows for the fan to be retrofit or modified, after assembly, should the aircraft incorporating the engine be utilized in a distinct environment.

Further, due to the increased stresses placed on the blade tips 240, relative to a remainder of the fan 200, in some cases the blade tips are exposed to substantial additional wear. In such examples, the utilization of a distinct partial shroud 230 component facilitates repairs by allowing removal of only the affected portion of the fan, and not requiring a replacement of the full blades.

While illustrated in FIG. 1, and described throughout as being applied to a tail mounted engine, one of skill in the art will appreciate that the fan construction disclosed herein can be applied to any gas turbine engine, and is not limited in application to tail mounted engines.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a turbine section;
   a fan mechanically connected to the turbine section such that rotation of the turbine drives rotation of the fan, wherein the fan comprises:
   a hub;
   a plurality of blade bodies extending radially outward from the hub to a first partial shroud;
   a plurality of blade tips extending radially outward from the first partial shroud;
   wherein the first partial shroud is positioned at a radial intersection with a boundary layer ingestion of a fan inlet in the range of 70% span to 90% span, where the hub defines 0% span and a radially outermost tip of the blade tips defines 100% span.

2. The gas turbine engine of claim 1, further comprising an outer shroud radially outward of the plurality of blade tips, and wherein the blade tips span from the partial shroud to the outer shroud.

3. The gas turbine engine of claim 1, wherein a quantity of blade tips in said plurality of blade tips is a multiple of a quantity of blade bodies in the plurality of blade bodies.

4. The gas turbine engine of claim 3, wherein a subset of the plurality of blade tips is aligned with corresponding blade bodies.

5. The gas turbine engine of claim 1, wherein a quantity of blade tips in said plurality of blade tips is not a whole number multiple of a quantity of blade bodies in the plurality of blade bodies.

6. The gas turbine engine of claim 1, wherein the gas turbine engine is a boundary layer ingestion engine.

7. The gas turbine engine of claim 1, further comprising a second partial shroud radially inward of the first partial shroud.

8. The gas turbine engine of claim 1, wherein the first partial shroud and the plurality of blade tips are a single integral component.

9. The gas turbine engine of claim 1, wherein the first partial shroud is attached to each blade tip in the plurality of blade tips.

10. The gas turbine engine of claim 1, wherein the first partial shroud extends at least a full axial length of the plurality of blade tips, relative to an axis defined by the fan.

11. The gas turbine engine of claim 1, wherein the first partial shroud extends less than a full axial length of the plurality of blade tips, relative to an axis defined by the fan.

12. The gas turbine engine of claim 1, wherein an axial length of each blade tip in the plurality of blade tips is less than an axial length of each blade body in the plurality of blade bodies.

13. The gas turbine engine of claim 12, wherein a ratio of the axial length of each of the blade bodies in the plurality of blade bodies to the axial length of each of the blade tips in the plurality of blade tips is less than or equal to two.

14. A fan for a gas turbine engine comprising:
   a hub;
   a first partial shroud radially outward of the hub;
   a plurality of blade bodies extending from the hub to the partial shroud;
   a plurality of blade tips extending radially outward from the partial shroud;
   wherein the first partial shroud is positioned at a radial intersection with a boundary layer ingestion of a fan inlet in the range of 70% span to 90% span, where the hub defines 0% span and a radially outermost tip of the blade tips defines 100% span.

15. The fan of claim 14, wherein a quantity of blade tips in said plurality of blade tips is a multiple of a quantity of blade bodies in the plurality of blade bodies.

16. The fan of claim 15, wherein a subset of the plurality of blade tips is aligned with corresponding blade bodies.

17. The fan of claim 14, further comprising a second partial shroud disposed between said hub and said first partial shroud.

* * * * *